(12) United States Patent
Jogdand et al.

(10) Patent No.: US 11,986,900 B2
(45) Date of Patent: May 21, 2024

(54) CATHODE SEATED LIQUID COOLANT TUBE FOR A PLASMA ARC CUTTING SYSTEM

(71) Applicant: Hypertherm, Inc., Hanover, NH (US)

(72) Inventors: Harshawardhan Jogdand, Lebanon, NH (US); Oliver Murphy, Hartland, VT (US); Jeremy Beliveau, Cornish, NH (US); Stephen M. Dunbar, Lebanon, NH (US); Girish Kamath, Lebanon, NH (US)

(73) Assignee: Hypertherm, Inc., Hanover, NH (US)

( * ) Notice: Subject to any disclaimer, the term of this patent is extended or adjusted under 35 U.S.C. 154(b) by 35 days.

(21) Appl. No.: 17/203,610

(22) Filed: Mar. 16, 2021

(65) Prior Publication Data
US 2021/0283709 A1    Sep. 16, 2021

Related U.S. Application Data

(60) Provisional application No. 62/990,176, filed on Mar. 16, 2020.

(51) Int. Cl.
*B23K 10/00* (2006.01)
*H05H 1/28* (2006.01)
*H05H 1/38* (2006.01)

(52) U.S. Cl.
CPC ............... *B23K 10/00* (2013.01); *H05H 1/28* (2013.01); *H05H 1/38* (2013.01)

(58) Field of Classification Search
CPC ...... B23K 10/00; B23K 9/285; B23K 10/006; B23K 10/02; H05H 1/28; H05H 1/34; H05H 1/3405; H05H 1/3421; H05H 1/3423; H05H 1/3431; H05H 1/3436; H05H 1/3442; H05H 1/3447; H05H 1/3457; H05H 1/3468; H05H 1/3473; H05H 1/3478; H05H 1/3484; H05H 1/3489; H05H 1/36; H05H 1/38; H05H 1/42

See application file for complete search history.

(56) References Cited

U.S. PATENT DOCUMENTS

| | | |
|---|---|---|
| 6,320,156 B1 | 11/2001 | Yamaguchi et al. |
| 6,946,617 B2 | 9/2005 | Brandt et al. |
| 10,129,969 B2 | 11/2018 | Mitra et al. |
| 10,561,010 B2 | 2/2020 | Roberts et al. |
| 2004/0200810 A1* | 10/2004 | Brandt ..................... H05H 1/34 219/121.49 |
| 2008/0116179 A1 | 5/2008 | Cook et al. |
| 2013/0313241 A1* | 11/2013 | Zander ................... B23K 9/295 219/137.62 |

(Continued)

*Primary Examiner* — Hung D Nguyen
(74) *Attorney, Agent, or Firm* — Cesari and McKenna, LLP

(57) ABSTRACT

A liquid coolant tube for a plasma arc cutting torch including a hollow elongated inner body shaped to translate within a hollow elongated outer body. The hollow elongated outer body of the liquid coolant tube is shaped to fixedly connect to the plasma arc cutting torch and includes a set of electrode guides. An external surface of the hollow elongated outer body and the set of electrode guides partially define a set of coolant flow channels between the set of electrode guides. The set of electrode guides are shaped to facilitate alignment of an electrode within the plasma arc cutting torch.

23 Claims, 12 Drawing Sheets

(56) References Cited

U.S. PATENT DOCUMENTS

| | | | |
|---|---|---|---|
| 2015/0083695 A1* | 3/2015 | Laurisch | H05H 1/34 219/121.48 |
| 2015/0102020 A1 | 4/2015 | Hollberg | |
| 2017/0181261 A1 | 6/2017 | Roberts et al. | |
| 2017/0295636 A1* | 10/2017 | Mitra | B23K 10/006 |

* cited by examiner

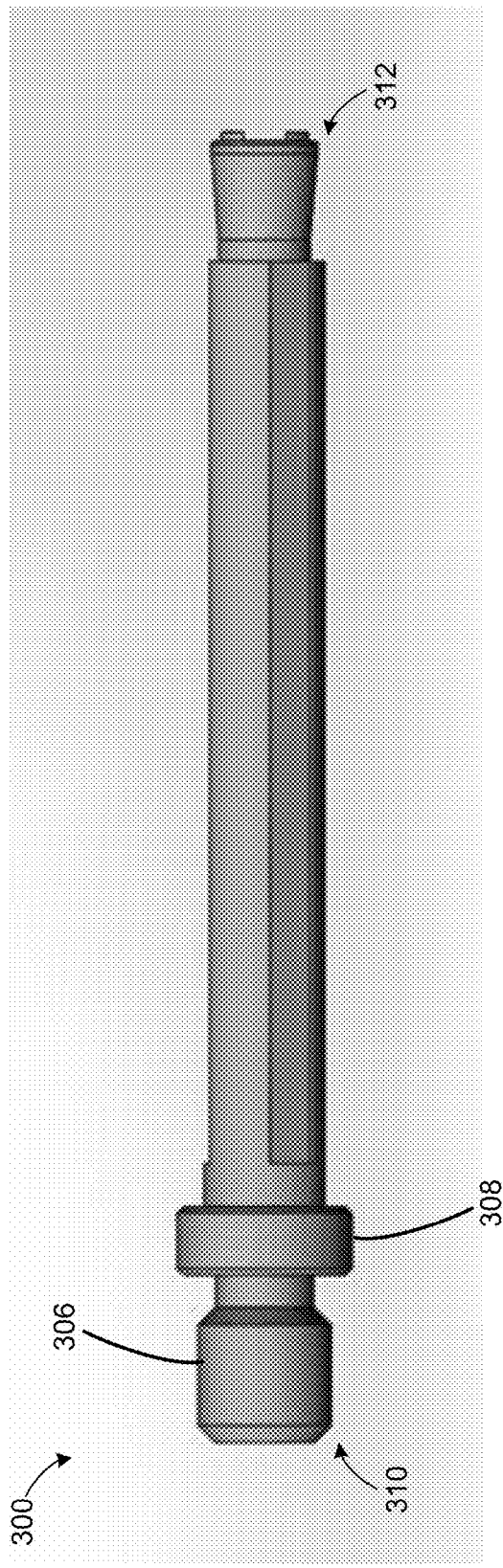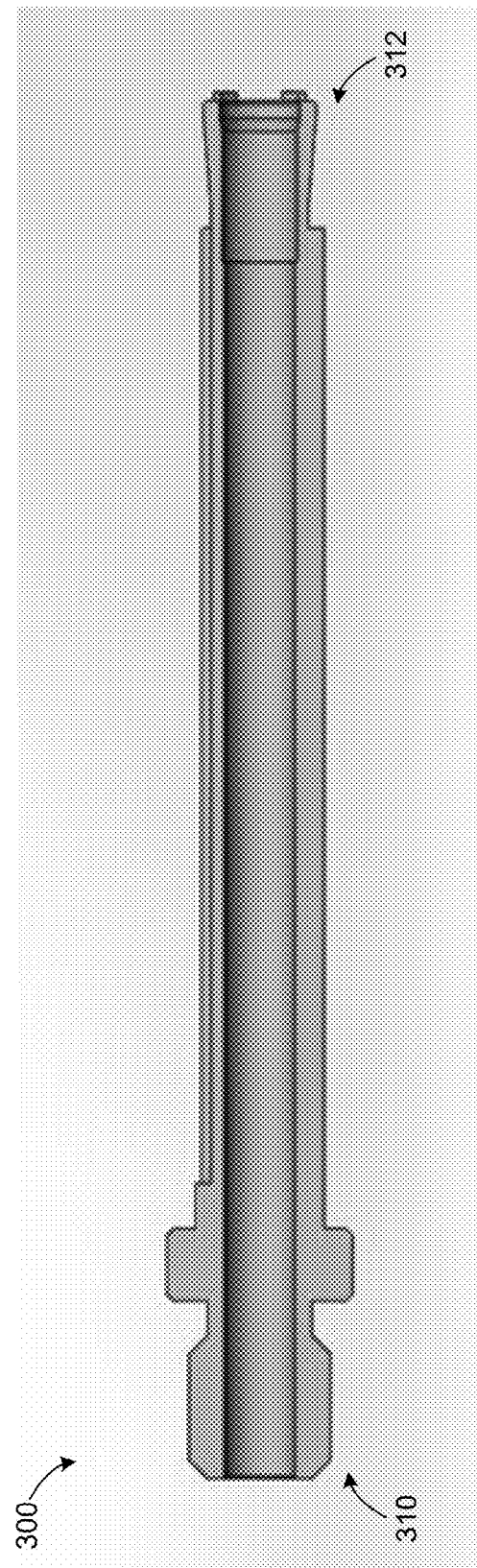

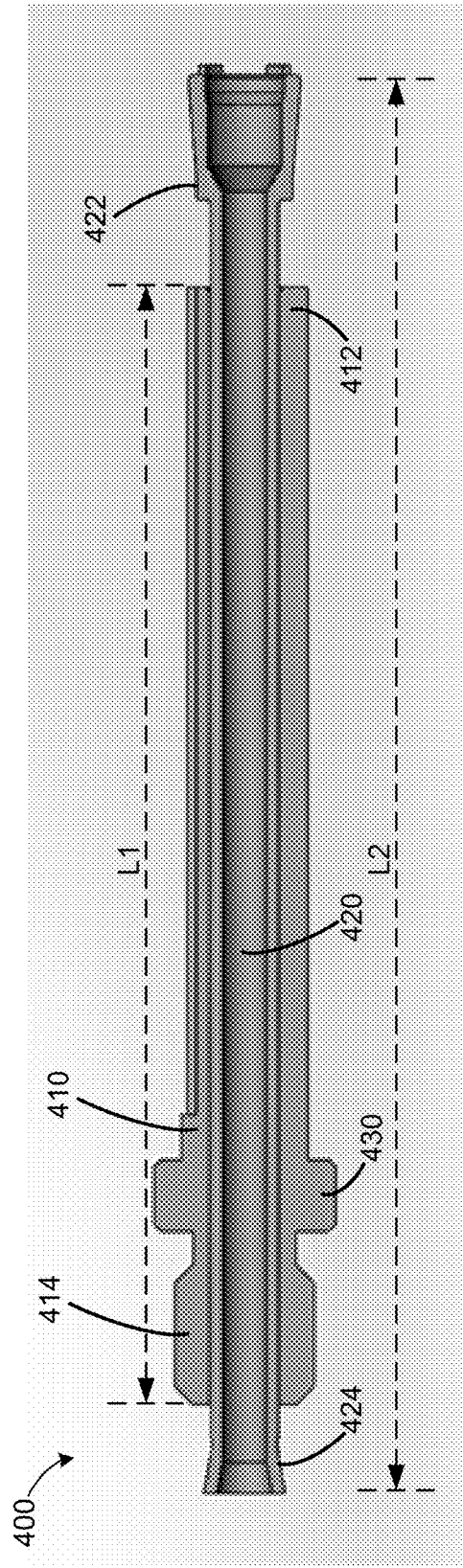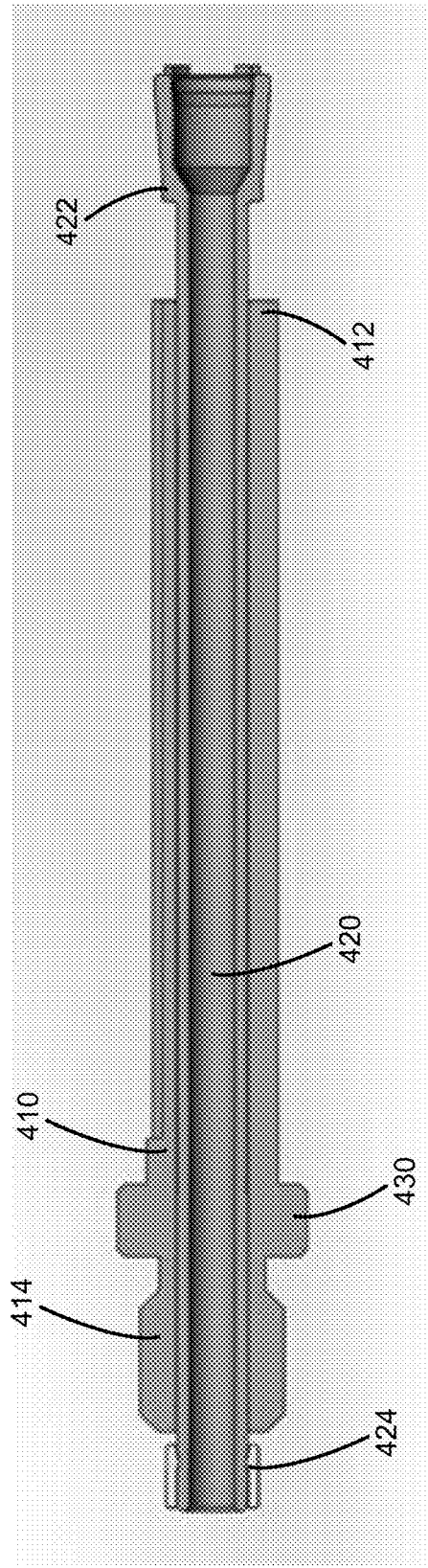
FIG. 3A
FIG. 3B

CATHODE SEATED LIQUID COOLANT TUBE FOR A PLASMA ARC CUTTING SYSTEM

CROSS REFERENCE TO RELATED APPLICATION

This application claims the benefit of and priority to U.S. Provisional Patent Application No. 62/990,176, filed Mar. 16, 2020, the entire contents of which are owned by the assignee of the instant application and incorporated herein by reference in their entirety.

FIELD OF THE INVENTION

The present invention relates generally to the field of plasma arc cutting systems and processes. More specifically, the invention relates to improved consumable components (e.g., coolant tubes) and operational methods for cooling a plasma arc torch.

BACKGROUND OF THE INVENTION

Industrial plasma cutting systems are often used for cutting and processing conductive materials (e.g., metals). During operation of the industrial plasma cutting system, electrical energy is converted to thermal energy which is transferred to the workpiece via a set of heat sensitive subcomponents (e.g., consumables) to evacuate or remove material and effect a cut and/or gouge. Effective heat removal (e.g., cooling) from the heat sensitive subcomponents (including consumables) is crucial to consumable life, cut quality, and overall performance of the industrial plasma cutting system.

Handheld, low current (e.g., less than about 130 Amps) portable plasma cutting systems typically use forced air cooling blown through the consumables in the torch for this purpose. Complexity of torch design, stringent cut quality and consumable life expectations, and comparatively high heat loads in heavy industrial applications (e.g., plasma arc systems consistently operating at over 130 Amps) warrant the use of liquid cooling (e.g., high-pressure, convective liquid (e.g., 30% Propylene Glycol, water) cooling). Most industrial plasma arc cutting systems which employ a liquid cooled design or set of consumables include a liquid coolant tube which directs and channels the coolant flow to and from the electrode.

Typical industrial plasma cutting systems that use a high voltage high frequency (HVHF/Tesla coil) ignition circuit typically have a set of consumables disposed within the torch which, with the exception of the liquid coolant tube, are stationary (e.g., meaning there is no relative motion between consumables) when assembled in the torch. In these systems, the liquid coolant tube however can slide or float relative to the other consumables (e.g., the electrode) to accommodate different electrode lengths while achieving proper flow gap(s) with the electrode during operation. In these systems, proper consumable alignment is not heavily dependent on the liquid coolant tube.

However, in liquid cooled plasma cutting systems that employ a contact start method for ignition (e.g., systems in which the consumables are dynamic relative to one another once installed within the torch or in which the electrode and nozzle translate relative to one another for ignition), maintaining proper consumable alignment and spacing between all of the consumables is a challenge. In these systems the plasma arc is generated by separating physical contact between two electrically conductive consumables (e.g., the electrode and the nozzle) while current is flowing through and between them (e.g., pilot arc mode). The movement of these consumables and exposure to high coolant pressures (e.g., 160-180 PSI for XPR 300) and high gas flows (e.g., greater than about 130 SCFH) during operation can cause misalignments between the consumables to be developed or be forced to happen by the high pressures during use. The misalignment caused by these high forces often results in poor consumable life and/or torch performance. Therefore, there is a need for systems that mitigate misalignment and/or assist alignment of consumables for liquid cooled plasma cutting systems that employ a contact start method for ignition.

SUMMARY OF THE INVENTION

Accordingly, an object of the invention is to provide systems and methods for facilitating alignment of an electrode within a plasma arc cutting torch using a liquid coolant tube. It is an object of the invention to provide a liquid coolant tube for a plasma arc cutting torch having electrode guides shaped to facilitate alignment of an electrode within the plasma arc cutting torch. It is an object of the invention to provide a liquid coolant tube for a plasma arc cutting torch having a hollow elongated inner body shaped to translate within a hollow elongated outer body and dimensioned to be supported by the hollow elongated outer body. It is an object of the invention to provide a torch tip for a plasma arc cutting torch having an electrode and a liquid coolant tube having electrode guides shaped to facilitate alignment of the electrode within the plasma arc cutting torch.

In some aspects, a liquid coolant tube for a plasma arc cutting torch includes a hollow elongated inner body shaped to translate within a hollow elongated outer body. The hollow elongated outer body of the liquid coolant tube includes a set of electrode guides and is shaped to fixedly connect to the plasma arc cutting torch. The hollow elongated outer body includes an external surface which, together with the set of electrode guides, partially define a set of coolant flow channels between the set of electrode guides. The set of electrode guides are shaped to facilitate alignment of an electrode within the plasma arc cutting torch.

In some embodiments, the set of coolant flow channels extend over a substantial axial length of the hollow elongated outer body. In other embodiments, the external surface of the hollow elongated outer body and an internal surface of the electrode define a gap having a coolant flow pressure.

In other embodiments, the set of electrode guides are lobed in cross-sectional shape to matingly engage an internal surface of the electrode. In some embodiments, a portion of the external surface of the hollow elongated outer body partially defining the set of coolant flow channels is flat in cross-sectional shape.

In some embodiments, a portion of the external surface of the hollow elongated outer body partially defining the set of coolant flow channels is concave in cross-sectional shape. In other embodiments, a distal tip of the hollow elongated outer body is chamfered.

In some aspects, a liquid coolant tube for a plasma arc cutting torch includes a hollow elongated outer body having a distal end and a proximal end. The proximal end of the hollow elongated outer body is configured to be fixedly connected to the plasma arc cutting torch. The liquid coolant tube also includes a hollow elongated inner body having a distal tip and a proximal tip. The hollow elongated inner body is shaped and dimensioned to translate within the hollow elongated outer body and to be supported by the hollow elongated outer body proximate the distal tip and proximate the proximal tip.

In some embodiments, the hollow elongated inner body is dimensioned to extend beyond the distal end of the hollow elongated outer body. In other embodiments, an axial translation of the hollow elongated inner body relative to the hollow elongated outer body increases a first distance between the distal tip of the hollow elongated inner body and the distal end of the hollow elongated outer body, and decreases a second distance between the proximal tip of the hollow elongated inner body and the proximal end of the hollow elongated outer body.

In some embodiments, the hollow elongated outer body includes a first axial length (L1) and the hollow elongated inner body includes a second axial length (L2) that is greater than L1. For example, in some embodiments, the hollow elongated outer body includes a first inner diameter (D1) and the hollow elongated inner body includes a second inner diameter (D2), a first outer diameter (DO1), and a second outer diameter (DO2) located across an axial length of a center portion of the hollow elongated inner body that is less than DO1. In some embodiments, a ratio of L2/DO1 is greater than about 2.

In other embodiments, an external surface of the hollow elongated outer body includes a set of lobed guide surfaces shaped to guide alignment of an electrode of the plasma arc cutting torch. In some embodiments, the liquid coolant tube includes a retention feature configured to restrict an axial translation of the hollow elongated inner body relative to the hollow elongated outer body. For example, in some embodiments, the retention feature includes at least one of a radially outward flaring of the hollow elongated inner body or a cap component disposed about the proximal tip of the hollow elongated inner body.

In some embodiments, the liquid coolant tube includes an alignment flange disposed on an external surface of the hollow elongated outer body and shaped to physically contact the torch via at least one of an axial surface or a circumferential surface. For example, in some embodiments, an outer diameter of the alignment flange is larger than an outer diameter of the hollow elongated outer body.

In some aspects, a liquid coolant tube for a plasma arc cutting torch includes a hollow elongated inner body shaped to fixedly connect to the plasma arc cutting torch. The liquid coolant tube also includes a hollow elongated outer body having a set of electrode guides. The hollow elongated outer body is shaped to translate along an external surface of the hollow elongated inner body. The hollow elongated outer body includes an external surface which, together with the set of electrode guides, partially define a set of coolant flow channels between the set of electrode guides. The set of electrode guides are shaped to facilitate alignment of an electrode within the plasma arc cutting torch.

In some embodiments, an axial translation of the hollow elongated outer body relative to the hollow elongated inner body increases a first distance between a distal end of the hollow elongated inner body and a distal end of the hollow elongated outer body, and increases a second distance between a proximal end of the hollow elongated inner body and a proximal end of the hollow elongated outer body.

In other embodiments, the liquid coolant tube includes a retention feature configured to restrict at least one of an axial translation or a rotation of the hollow elongated outer body relative to the hollow elongated inner body.

In some embodiments, the hollow elongated inner body includes a first outer diameter (DO1) at a proximal end and a distal end of the hollow elongated inner body, and a second outer diameter (DO2) located across an axial length of a center portion of the hollow elongated inner body that is less than DO1.

In some aspects, a torch tip for a plasma arc cutting torch includes an electrode having an elongated electrode body defining a cavity configured to receive a distal portion of a liquid coolant tube. The torch tip also includes a liquid coolant tube having a hollow elongated inner body shaped to translate within a hollow elongated outer body. The hollow elongated outer body of the liquid coolant tube includes a set of electrode guides and is shaped to fixedly connect to the plasma arc cutting torch. The hollow elongated outer body includes an external surface which, together with the set of electrode guides, partially define a set of coolant flow channels between the set of electrode guides. The set of electrode guides are shaped to facilitate alignment of the electrode within the plasma arc cutting torch.

In some aspects, a method of aligning an electrode within a plasma arc cutting torch includes installing a liquid coolant tube including a set of electrode guides and a set of coolant flow channels between the set of electrode guides. The method also includes installing the electrode within the plasma arc cutting torch. The electrode includes an elongated electrode body defining a cavity configured to receive a distal portion of the liquid coolant tube. Further, the method includes producing a coolant flow to the plasma arc cutting torch through the set of coolant flow channels. The method further includes producing a coolant flow pressure in a gap between an external surface of the liquid coolant tube and an internal surface of the electrode. The set of electrode guides influence electrode alignment via the coolant flow pressure in the gap.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2A is a side view of an exemplary liquid coolant tube, according to an embodiment of the invention.

FIG. 2B is an illustrative cross-section of the exemplary liquid coolant tube shown in FIG. 2A, according to an embodiment of the invention.

FIG. 3A is an illustrative cross-section of an exemplary liquid coolant tube with a flared retention feature, according to an embodiment of the invention.

FIG. 3B is an illustrative cross-section of an exemplary liquid coolant tube with a cap retention feature, according to an embodiment of the invention.

DETAILED DESCRIPTION OF THE INVENTION

In some aspects, the systems and methods described herein can include one or more mechanisms or methods for facilitating alignment of an electrode within a plasma arc cutting torch using a liquid coolant tube. The system and methods can include a liquid coolant tube for a plasma arc cutting torch having electrode guides shaped to facilitate alignment of an electrode within the plasma arc cutting torch. The system and methods can include a liquid coolant tube for a plasma arc cutting torch having a hollow elongated inner body shaped to translate within a hollow elongated outer body and dimensioned to be supported by the hollow elongated outer body. The system and methods can include a torch tip for a plasma arc cutting torch having an electrode and a liquid coolant tube having electrode guides shaped to facilitate alignment of the electrode within the plasma arc cutting torch.

In one aspect of the invention, the systems and methods described herein include a liquid coolant tube design for a plasma arc cutting torch that helps to maintain alignment between consumables during plasma arc generation and torch operation. The liquid coolant used in the design can be water-based, propylene glycol-based, or another suitable liquid coolant. For example, the liquid coolant tube can help to maintain alignment between the electrode and nozzle while they are moving relative to each other while the consumables are exposed to high coolant and gas pressures. Some embodiments of the design also allow for a single liquid coolant tube to accommodate different electrode lengths while achieving optimum flow gap(s) with the electrode during operation. In some embodiments, the liquid coolant tube directs and channels the coolant flow to and from the electrode in the plasma arc torch, and accommodates a number of different electrode lengths while consistently achieving optimum flow gap(s) with the electrode during operation and while also maintaining alignment between the consumables (electrode and nozzle) that are under high coolant pressure themselves.

Figure 1A:
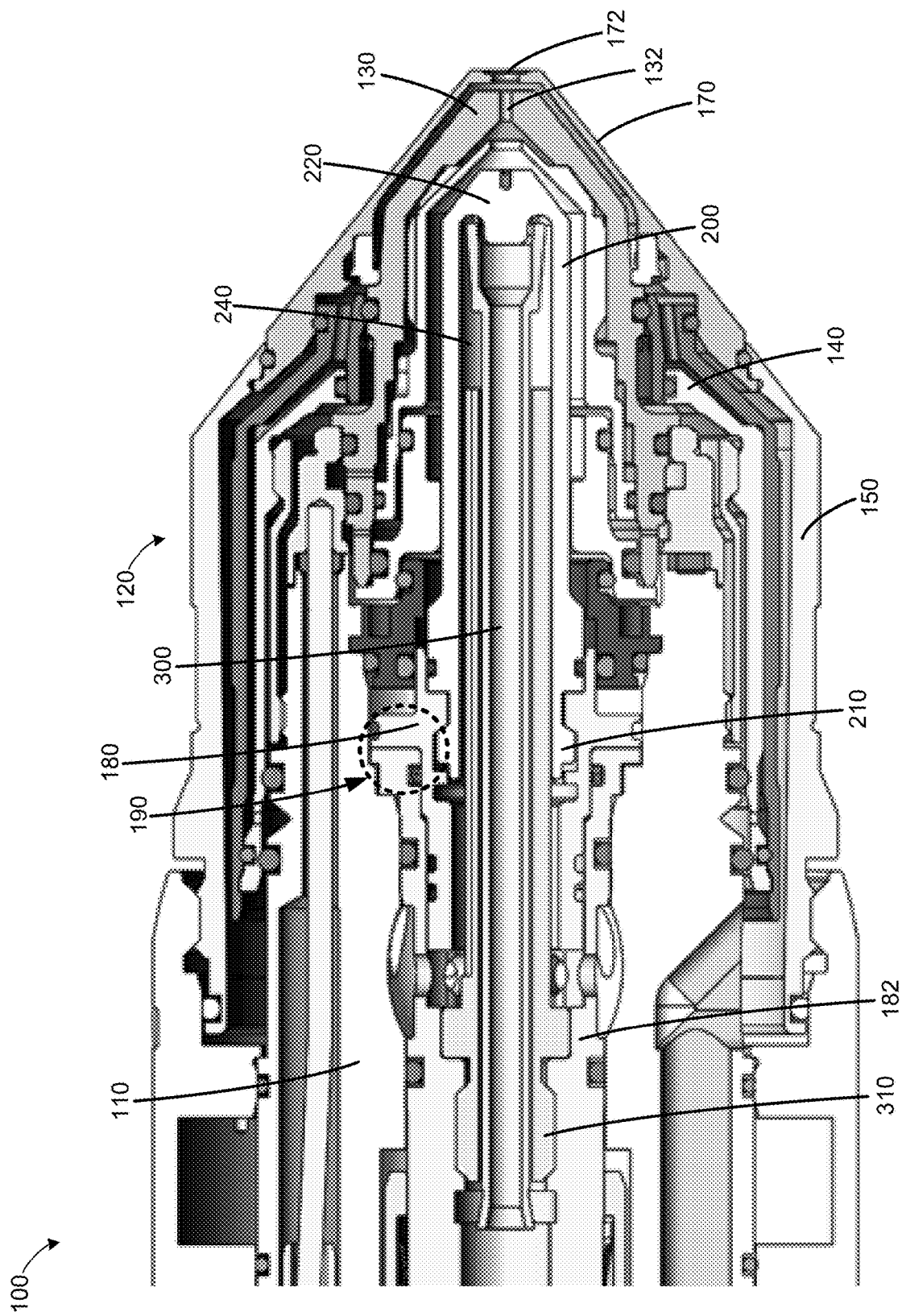
FIG. 1A is an illustrative cross-section of an exemplary plasma arc cutting torch, according to an embodiment of the invention.

FIG. 1A is a cross-sectional view of a liquid cooled contact start plasma arc cutting torch 100 with a liquid coolant tube 300, according to an illustrative embodiment of the present invention. The plasma arc cutting torch 100 includes a torch body 110 coupled to the liquid coolant tube 300 and a torch tip 120 having multiple consumables including, for example, an electrode 200, a nozzle 130, an inner retaining cap 140, an outer retaining cap 150, and a shield 170. As illustrated, the electrode 200 has an elongated body defining a proximal end 210 and a distal end 220. In some embodiments, the elongated body of the electrode 200 has an emissive insert disposed in the distal end 220 so that an emission surface is exposed. The insert can be made of hafnium or other materials that possess suitable physical characteristics, including corrosion resistance and a high thermionic emissivity. A cavity 240 is disposed at the distal end 220 of the electrode 200 at its inner surface for receiving at least a distal portion of the liquid coolant tube 300. In some embodiments, the cavity 240 includes a step or protrusion for orienting and aligning the liquid coolant tube 300, and allowing a liquid coolant from the liquid coolant tube 300 to flow around the distal portion of the electrode 200 that is holding the emissive insert, thereby cooling the distal portion and/or the insert.

The nozzle 130 is spaced from the electrode 200 and has a central nozzle exit orifice 132. In some embodiments, a plenum is defined between the nozzle 130 and the electrode 200. The inner retaining cap 140 is fixedly connected (e.g., threaded) to the torch body 110 to retain the nozzle 130 to the torch body 110 and to radially and/or axially position the nozzle 130 with respect to a longitudinal axis of the torch 100. In some embodiments, the torch 100 includes a swirl ring mounted around the electrode 200 configured to impart a tangential velocity component to a plasma gas flow, thereby causing the plasma gas flow to swirl. The shield 170, which includes a shield exit orifice 172, is connected to the outer retaining cap 150 that secures the shield 170 to the torch body 110. The nozzle exit orifice 132 and optionally, the shield exit orifice 172, define a plasma arc exit orifice through which a plasma arc is delivered to a workpiece during torch operation. The plasma arc cutting torch 100 can additionally include electrical connections, passages for cooling, and passages for arc control fluids (e.g., plasma gas).

The plasma arc cutting torch 100 has a two-piece cathode attached to the back of the electrode 200 where one of the pieces is stationary i.e., attached to the torch 100 and the second piece can axially move relative to the stationary piece—the interface 190 of these two pieces is illustrated in FIG. 1A. As shown in FIG. 1A, the electrode 200 is attached to the movable second piece of the cathode 180 to allow for motion (e.g., axial translation) of the electrode relative to the nozzle 130 and thereby plasma arc piloting and generation. The liquid coolant tube 300 is fixedly connected (e.g., threaded) at its proximal end 310 to the torch body via the stationary first piece of the cathode 182 and includes a large annular surface area (e.g., the liquid coolant tube seat) axially forward of the connection point where it seats in and substantially contacts the cathode both axially and radially, this contact ensuring that the liquid coolant tube 300 is perpendicular with respect to the cathode. The liquid coolant tube seat dimensions are precisely controlled such that they ensure desired liquid coolant tube alignment (diametric position) with respect to the torch current ring.

During operation of the plasma arc cutting torch 100, the subassembly of the electrode 200 & movable cathode 180 routinely slide over the outer diameter of the liquid coolant tube 300 where the geometric dimensioning and tolerancing (GD&T) of the consumables ensures that the gap between the outer diameter of the liquid coolant tube 300 and the inner diameter of the electrode 200 is carefully controlled. During operation (e.g., while the power supply is on, while the coolant pump is running, while the torch is firing, etc.) this gap is filled with coolant under pressure which assists in centering the electrode 200 around the liquid coolant tube 300 and in driving and/or controlling the axial movement of the electrode 200 and movable cathode portion. The presence of this annulus of liquid coolant between the liquid coolant tube 300 and the electrode 200 promotes and maintains good alignment between the tip/nose of the electrode 200 and nozzle bore during operation.

Figure 1B:
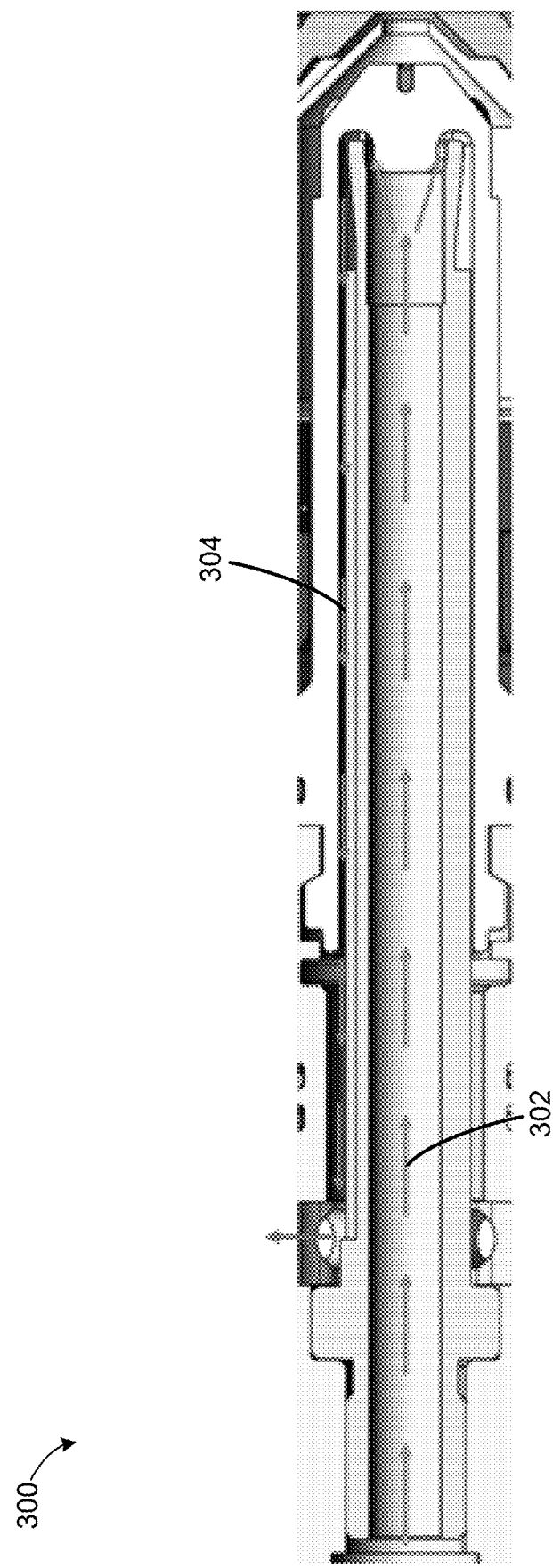
FIG. 1B is an illustrative cross-section of a portion of the exemplary plasma arc cutting torch shown in FIG. 1A, according to an embodiment of the invention.

As shown in FIG. 1B, during operation at high pressure (e.g., about 160 psi to about 180 psi), the low temperature coolant flow path 302 enters the interior diameter/center channel of the liquid coolant tube 300 and flows through the gap at the tip of the liquid coolant tube 300 between electrode boss and the liquid coolant tube 300. On the return path 304, relatively low pressure (e.g., about 80 psi to about 110 psi), warm coolant flows through the annulus formed by the interior diameter of the electrode 200 and outer diameter of the liquid coolant tube 300 to the back/stationary portion of the cathode where it extends radially outward away from contact with the liquid coolant tube 300.

FIGS. 2A and 2B are a side view and an illustrative cross-section of an exemplary liquid coolant tube 300, respectively. As shown, the external surface of the liquid coolant tube 300 includes a connection portion 306 and a seating portion 308 at the proximal end 310, as well as a set of channels and contact surfaces extending substantially along its length between the proximal 310 and distal ends 312. These channels and contact surfaces form part of the coolant return path 304. The depth, width and placement of these channels and contact surfaces around the liquid coolant tube axis can vary in different embodiments. In some embodiments, the maximum outer diameter of the coolant tube is smaller than the least interior diameter of the electrode in order to achieve a desired performance. These channels are created to allow sufficient coolant flow even in the worst assembly case. In some embodiments, the external surface of the liquid coolant tube 300 includes milled slots or channels. In other embodiments, the liquid coolant tube 300 includes lobed channel guides that define the channels. For example, as discussed further below in relation to FIGS. 4B and 4C, lobed channel guides can define curved surfaces that can ensure alignment and flat surfaces that can form the flow path 304 with the inner surface of the electrode 200.

The channels partially defined by liquid coolant tube 300 promote coolant flow back toward the exhaust point while the contact surfaces of the liquid coolant tube 300 further drive consumable alignment, balancing flows about the liquid coolant tube 300 and between the liquid coolant tube 300 and the electrode 200. Preferably, as described below in relation to FIGS. 4A and 4B, a pressure (e.g., pressurized liquid coolant in a gap 460 defined between the contact surfaces of the liquid coolant tube 300 and the interior surface of the electrode 200 drives consumable alignment without direct contact between the liquid coolant tube 300 and the electrode 200. The embodiment of FIGS. 2A and 2B can be tailored to a specific length of electrode 200 and thus separate liquid coolant tubes may be needed to accommodate different consumable stack ups. Some embodiments of the invention are able to accommodate different length consumable stack ups via the use of two or more liquid coolant tube components (e.g., a coolant tube with between about 3 and 4 inches in length and an ability to accommodate electrode length variations of up to about 0.4 inches, preferable about 0.25 inches). For example, as discussed further below in relation to FIG. 3A, these components can have relative axial movement between each other but are constrained such that they cannot separate from each other.

FIGS. 3A and 3B are cross-sectional views of a liquid coolant tube 400 for a plasma arc cutting torch 100, according to illustrative embodiments of the present invention. The liquid coolant tube 400 includes a hollow elongated outer body 410 and a hollow elongated inner body 420 shaped to translate within the hollow elongated outer body 410. The hollow elongated outer body 410 includes a distal end 412 and a proximal end 414. The hollow elongated outer body 410 is shaped to fixedly connect (e.g., threaded) to the plasma arc cutting torch 100. For example, in some embodiments, the proximal end 414 of the hollow elongated outer body 410 is configured to be fixedly connected (e.g., threaded) to the plasma arc cutting torch 100. The hollow elongated inner body 420 includes a distal tip 422 and a proximal tip 424. The hollow elongated inner body 420 is shaped and dimensioned to be supported by the hollow elongated outer body 410 proximate the distal tip 422 and proximate the proximal tip 424.

The hollow elongated outer body 410 has a first axial length (L1) and the hollow elongated inner body 420 has a second axial length (L2) larger than L1. As shown, the hollow elongated inner body 420 is dimensioned to extend beyond the distal end 412 of the hollow elongated outer body 410. In some embodiments, an axial translation of the hollow elongated inner body 420 relative to the hollow elongated outer body 410 increases a first distance between the distal tip 422 of the hollow elongated inner body 420 and the distal end 412 of the hollow elongated outer body 410, and decreases a second distance between the proximal tip 424 of the hollow elongated inner body 420 and the proximal end 414 of the hollow elongated outer body 410. The telescopic motion between the hollow elongated outer body 410 and the hollow elongated inner body 420 helps accommodate different electrode lengths, each time maintaining an optimum flow gap with the distal tip of the electrode 200 during operation (hollow elongated inner body 420 biased forward via the coolant flow).

The embodiments of FIGS. 3A and 3B include a retention feature configured to restrict an axial translation of the hollow elongated inner body 420 relative to the hollow elongated outer body 410. The restriction created by the retention feature is such that the two components cannot slide axially far enough to separate. For example, as shown in the embodiment of FIG. 3A, the retention feature can be formed from a radially outward flaring of the hollow elongated inner body 420 at the proximal tip 424. In another example, as shown in the embodiment of FIG. 3B, the retention feature can be formed from a cap component disposed about the proximal tip 424 of the hollow elongated inner body 420. In some embodiments, the cap component can be snapped onto a groove or step at the proximal tip 424 of the hollow elongated inner body 420. In other embodiments, an E-clip/circlip like commercial component can be snapped onto a groove or step at the proximal tip 424 of the hollow elongated inner body 420. In some embodiments, the liquid coolant tube 400 does not include a retention feature such that the hollow elongated inner body 420 can be separated from the hollow elongated outer body 410.

In some embodiments, the liquid coolant tube 400 includes an alignment flange 430 disposed on an external surface of the hollow elongated outer body 410. The alignment flange 430 can be shaped to physically contact the torch 100 via at least one of an axial surface or a circumferential surface. In some embodiments, an outer diameter of the alignment flange 430 is larger than an outer diameter of the hollow elongated outer body 410.

Figure 4A:
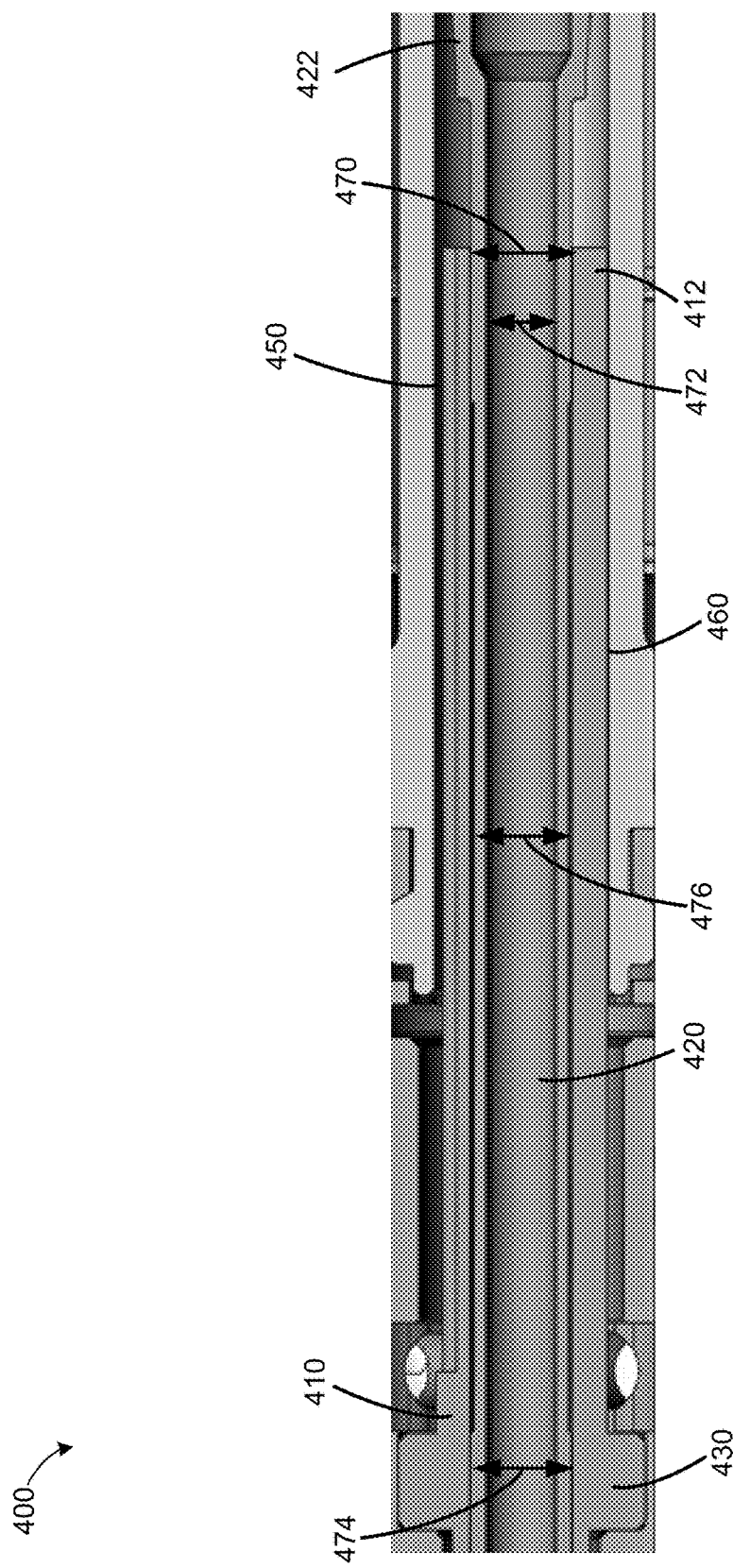
FIG. 4A is an illustrative cross-section of an exemplary liquid coolant tube within an exemplary plasma arc cutting torch, according to an embodiment of the invention.
Figure 4B:
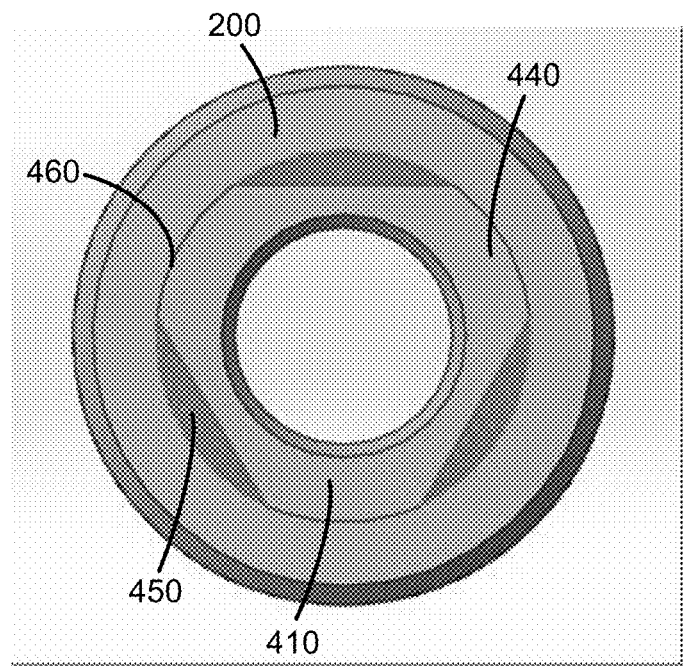
FIG. 4B is an illustrative cross-section of the exemplary liquid coolant tube shown in FIG. 4A and an exemplary electrode, according to an embodiment of the invention.
Figure 4C:
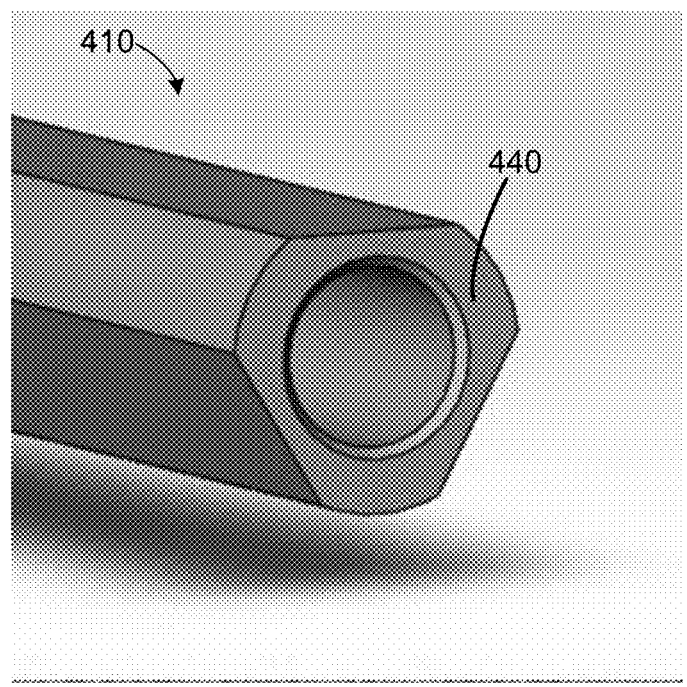
FIG. 4C is a perspective view of the external body of the exemplary liquid coolant tube shown in FIGS. 4A and 4B, according to an embodiment of the invention.

FIGS. 4A, 4B, and 4C illustrate the lobed guide features of liquid coolant tube 400, according to embodiments of the invention. FIG. 4A is an illustrative cross-section of liquid coolant tube 400 within plasma arc cutting torch 100. FIG. 4B is an illustrative cross-section of liquid coolant tube 400 and electrode 200. FIG. 4C is a perspective view of the hollow elongated outer body 410 of liquid coolant tube 400.

As shown, the hollow elongated outer body 410 can include a set of electrode guides 440. An external surface of the hollow elongated outer body 410 and the set of electrode guides 440 partially define a set of coolant flow channels 450 between the set of electrode guides 440. In some embodiments, the set of coolant flow channels 450 extend over a substantial axial length of the hollow elongated outer body 410. The set of electrode guides 440 are shaped to facilitate alignment of the electrode 200 within the plasma arc cutting torch 100. For example, in some embodiments, the set of electrode guides 440 are lobed in cross-sectional shape to matingly engage (e.g., via a coolant layer intermediary) an internal surface of the electrode 200. In some embodiments, portions of the set of electrode guides 440 directly physically contact an internal surface of the electrode 200 to assist with electrode alignment.

In a preferred embodiment, the external surface of the hollow elongated outer body 410 and an internal surface of the electrode 200 define a gap 460 having a coolant flow pressure. For example, in a preferred embodiment, the coolant flow pressure in the gap 460 due to the coolant flow through the set of coolant flow channels 450 influences alignment of electrode 200. The coolant flow pressure in the gap 460 allows for electrode alignment without direct contact between the external surface of the hollow elongated outer body 410 and an internal surface of the electrode 200. As shown in FIGS. 4B and 4C, in some embodiments, the portion of the external surface of the hollow elongated outer body 410 partially defining the set of coolant flow channels 450 is flat in cross-sectional shape. In other embodiments, the portion of the external surface of the hollow elongated outer body 410 partially defining the set of coolant flow channels 450 is concave in cross-sectional shape.

As shown in FIG. 4A, in some embodiments, the internal diameter of the hollow elongated outer body 410 and the outer diameter of the hollow elongated inner body 420 (on both ends) are dimensioned to ensure tight sliding fit. For example, the hollow elongated outer body 410 has a first inner diameter 470 and the hollow elongated inner body 420 has a second inner diameter 472, a first outer diameter 474, and a second outer diameter 476 located across an axial length of a center portion of the hollow elongated inner body 420. In some embodiments, wherein the second outer diameter 476 is less than the first outer diameter 474. The contact surface area and thus the friction between the two sliding components is minimized by relieving the outer diameter of the hollow elongated inner body 420 as shown. By reducing the outer diameter of the hollow elongated inner body 420 in the center portion, the hollow elongated inner body 420 and the hollow elongated outer body 410 only contact one another proximate the ends of the hollow elongated outer body 410 (e.g., the most crucial and distant locations for alignment). In some embodiments, a ratio of the axial length L2 of the hollow elongated inner body 420 and the first outer diameter 474 of the hollow elongated inner body 420 is greater than about 2.

Figure 5:
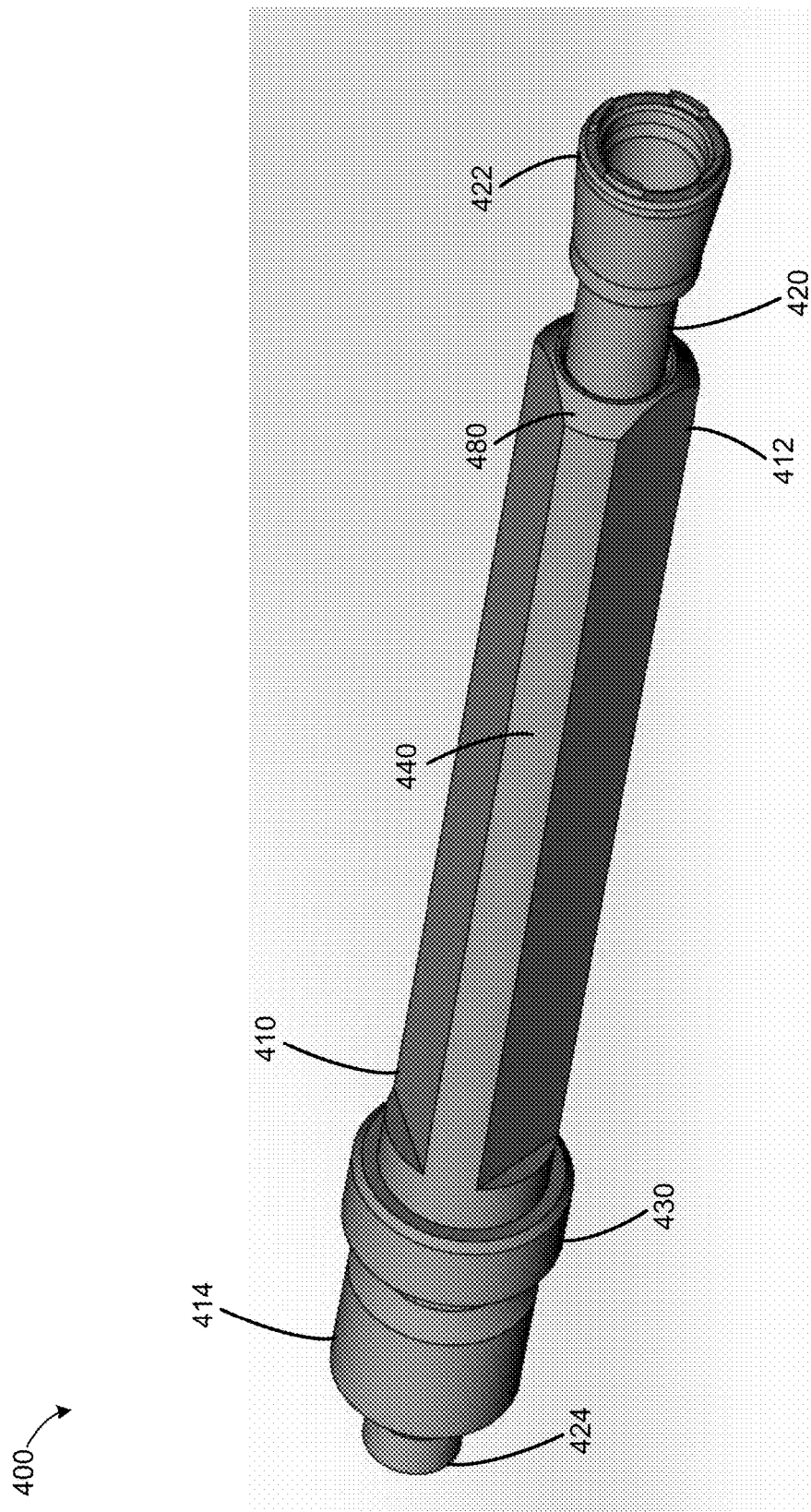
FIG. 5 is a perspective view of an exemplary liquid coolant tube, according to an embodiment of the invention.
Figure 6A:
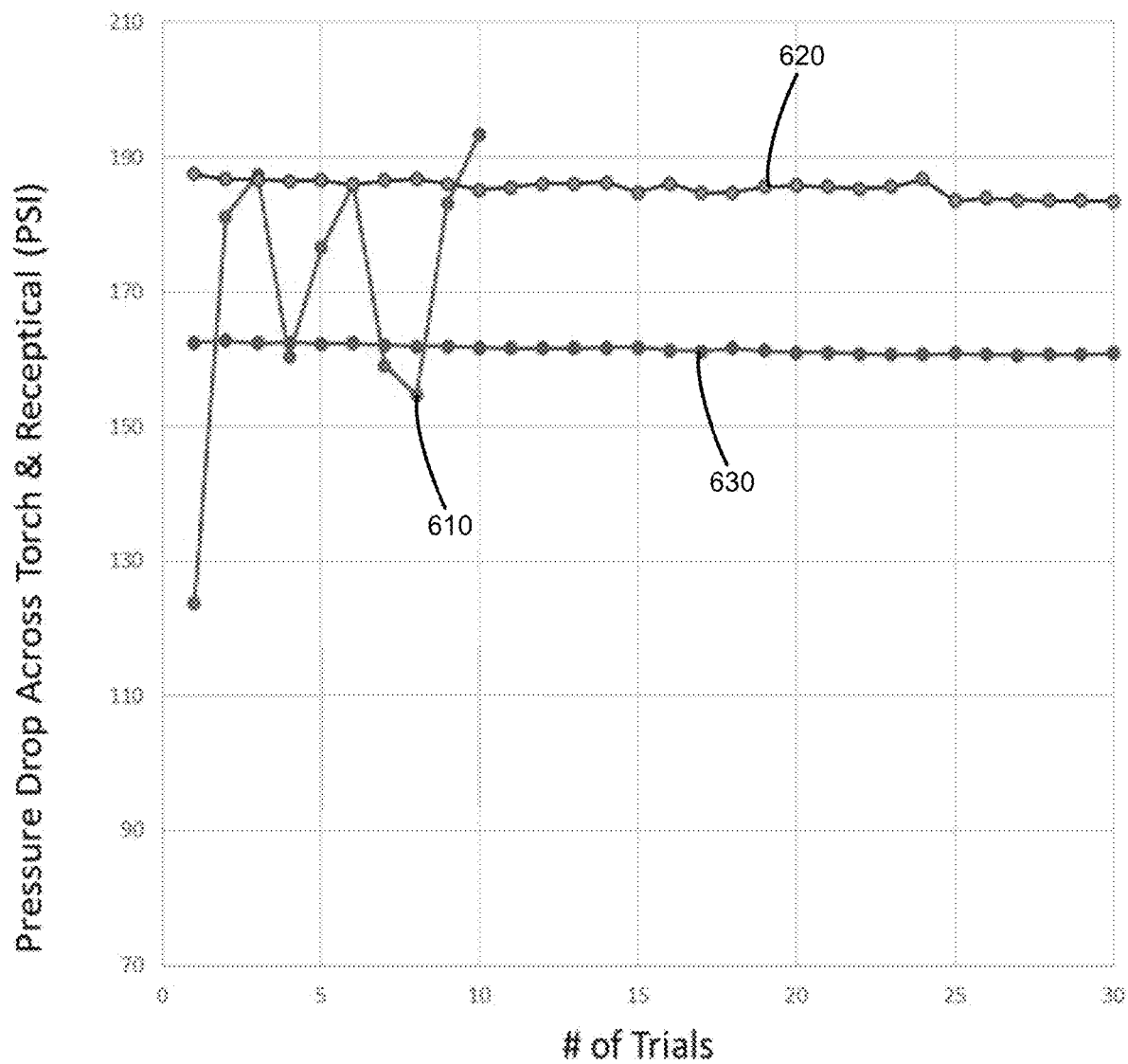
FIG. 6A is a graph illustrating pressure drop across a plasma arc cutting torch and receptacle, according to embodiments of the invention.
Figure 6B:
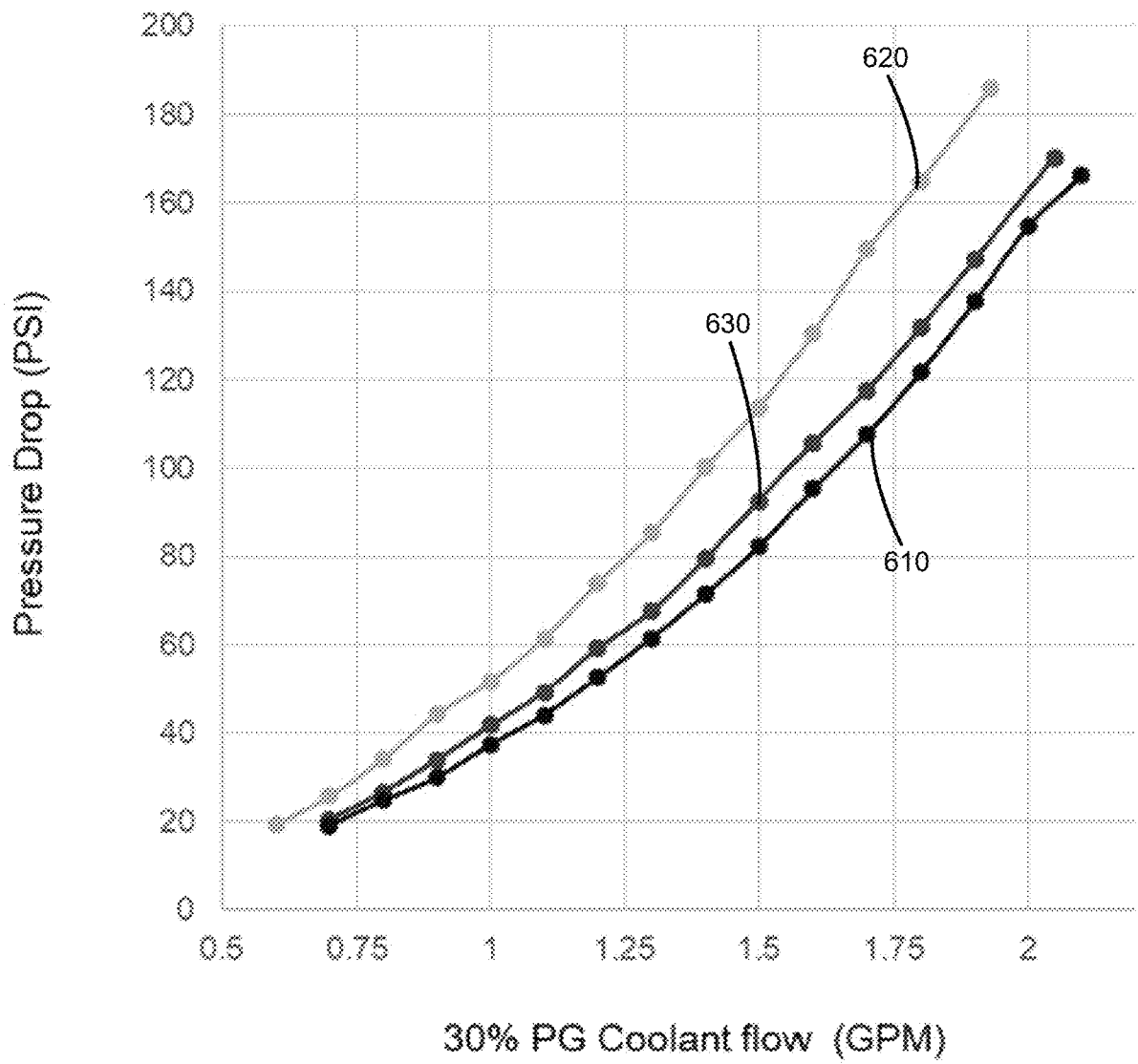
FIG. 6B is a graph illustrating pressure drop across a plasma arc cutting torch and receptacle as a function of coolant flow rate, according to an embodiment of the invention.

FIG. 5 is a perspective view of liquid coolant tube 400, according to an embodiment of the invention. As shown, the distal tip 480 of the hollow elongated outer body 410 is chamfered. The chamfered distal tip 480 reduces the pressure drop across the coolant path of the plasma arc cutting torch 100 and receptacle at higher flow rates. For example, FIGS. 6A and 6B illustrate performance measurements for liquid coolant tubes of various designs. As shown in FIG. 6A, the liquid coolant tube embodiments described herein demonstrate consistent pressure drop from cycle to cycle (620) compared to previous designs (610). Further, liquid coolant tube designs having lobed guides demonstrate a reduced and consistent pressure drop from cycle to cycle (630). As shown in FIG. 6B, the liquid coolant tube embodiments described herein demonstrate comparable pressure drops at various flow rates (620 and 630) compared to previous designs (610).

Figure 7A:
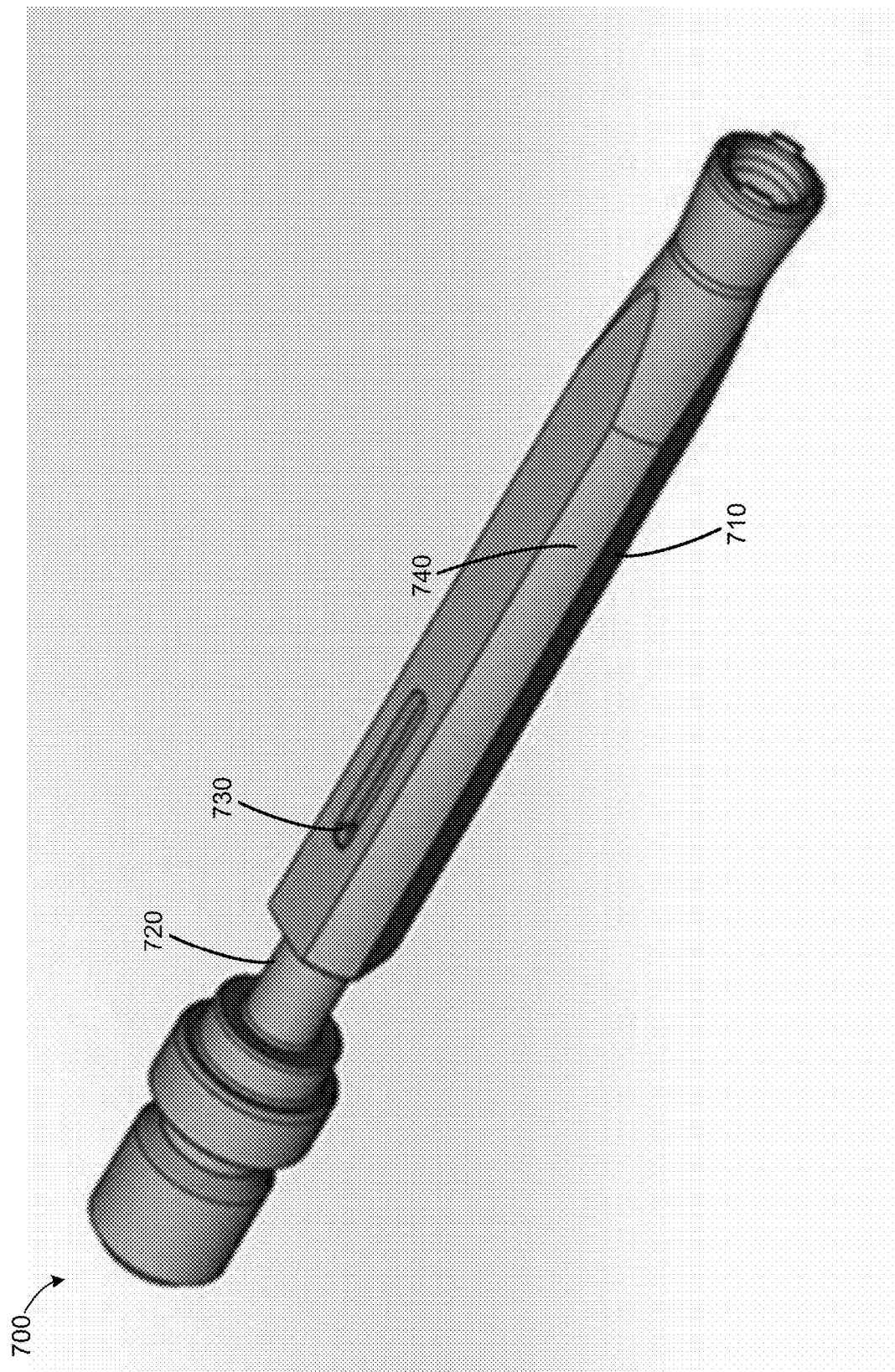
FIG. 7A is a perspective view of an exemplary liquid coolant tube, according to an embodiment of the invention.
Figure 7B:
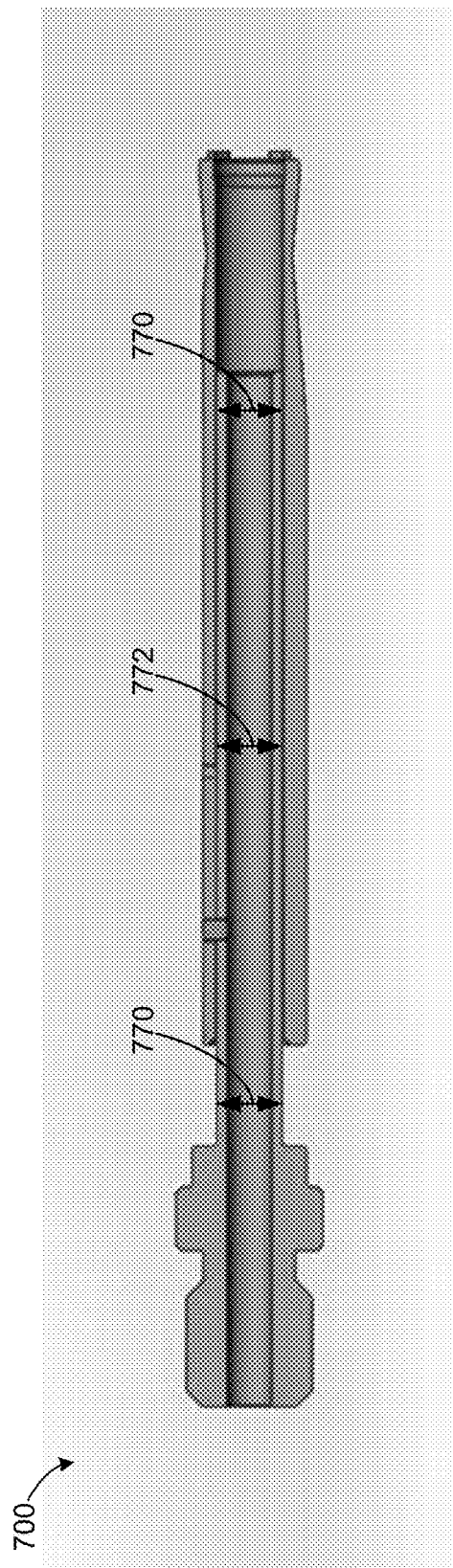
FIG. 7B is an illustrative cross-section of the exemplary liquid coolant tube shown in FIG. 7A, according to an embodiment of the invention.
Figure 7C:
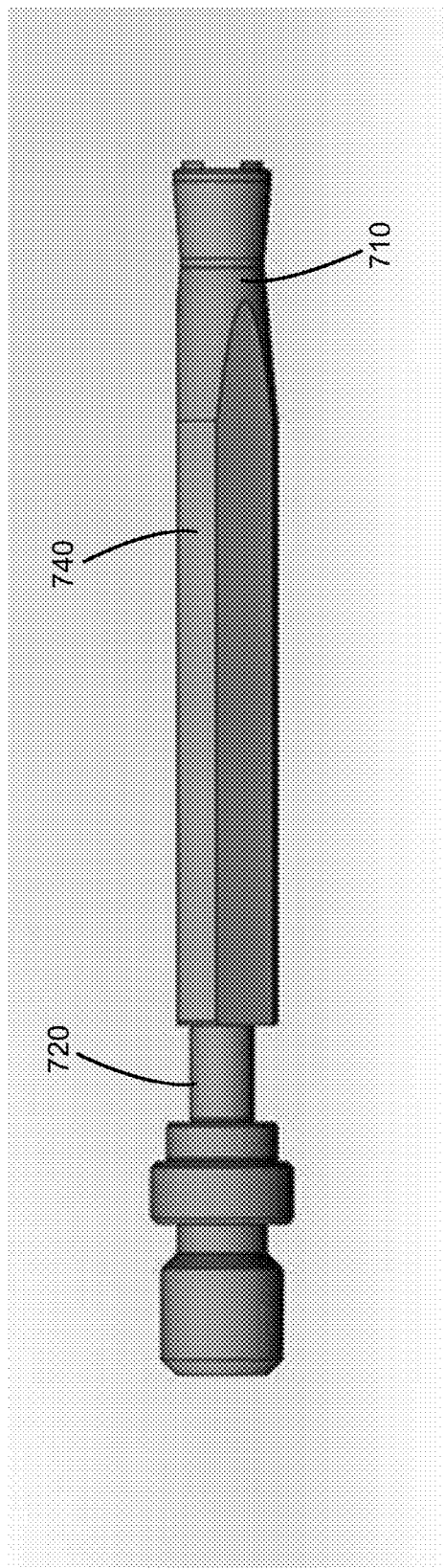
FIG. 7C is a side view of the exemplary liquid coolant tube shown in FIGS. 7A and 7B, according to an embodiment of the invention.

Referring to FIGS. 7A, 7B, and 7C, an exemplary liquid coolant tube 700 having a fixed hollow elongated inner body 720 and a translatable hollow elongated outer body 710 is illustrated. In this embodiment, the hollow elongated inner body 720 is shaped to fixedly connect to the plasma arc cutting torch 100. The hollow elongated outer body 710 is shaped to translate along an external surface of the hollow elongated inner body 720 and includes a set of electrode guides 740. An external surface of the hollow elongated outer body 710 and the set of electrode guides 740 partially define a set of coolant flow channels between the set of electrode guides 740. The set of electrode guides 740 are shaped to facilitate alignment of an electrode 200 within the plasma arc cutting torch 100. In some embodiments, the external surface of the hollow elongated outer body 710 and an internal surface of the electrode 200 define a gap having a coolant flow pressure. For example, in some embodiments, the coolant flow pressure in the gap due to the coolant flow through the set of coolant flow channels influences alignment of electrode 200. The coolant flow pressure in the gap allows for electrode alignment without direct contact between the external surface of the hollow elongated outer body 710 and an internal surface of the electrode 200.

In some embodiments, the liquid coolant tube 700 includes a retention feature 730 (e.g., spring) configured to restrict at least one of an axial translation or a rotation of the hollow elongated outer body 710 relative to the hollow elongated inner body 720. In one embodiment, retention feature 730 bias hollow elongated outer body 710 and hollow elongated inner body 720 into a specific spaced relationship relative one another (e.g., apart for proper seating and spacing with electrode).

In some embodiments, an axial translation of the hollow elongated outer body 710 relative to the hollow elongated inner body 720 increases a first distance between a distal end of the hollow elongated inner body 720 and a distal end of the hollow elongated outer body 710, and increases a second distance between a proximal end of the hollow elongated inner body 720 and a proximal end of the hollow elongated outer body 710.

In some embodiments, the hollow elongated inner body 720 includes a first outer diameter 770 at a proximal end and a distal end of the hollow elongated inner body, and a second outer diameter 772 located across an axial length of a center portion of the hollow elongated inner body 720. In some embodiments, second outer diameter 772 is less than first outer diameter 770.

Figure 8:
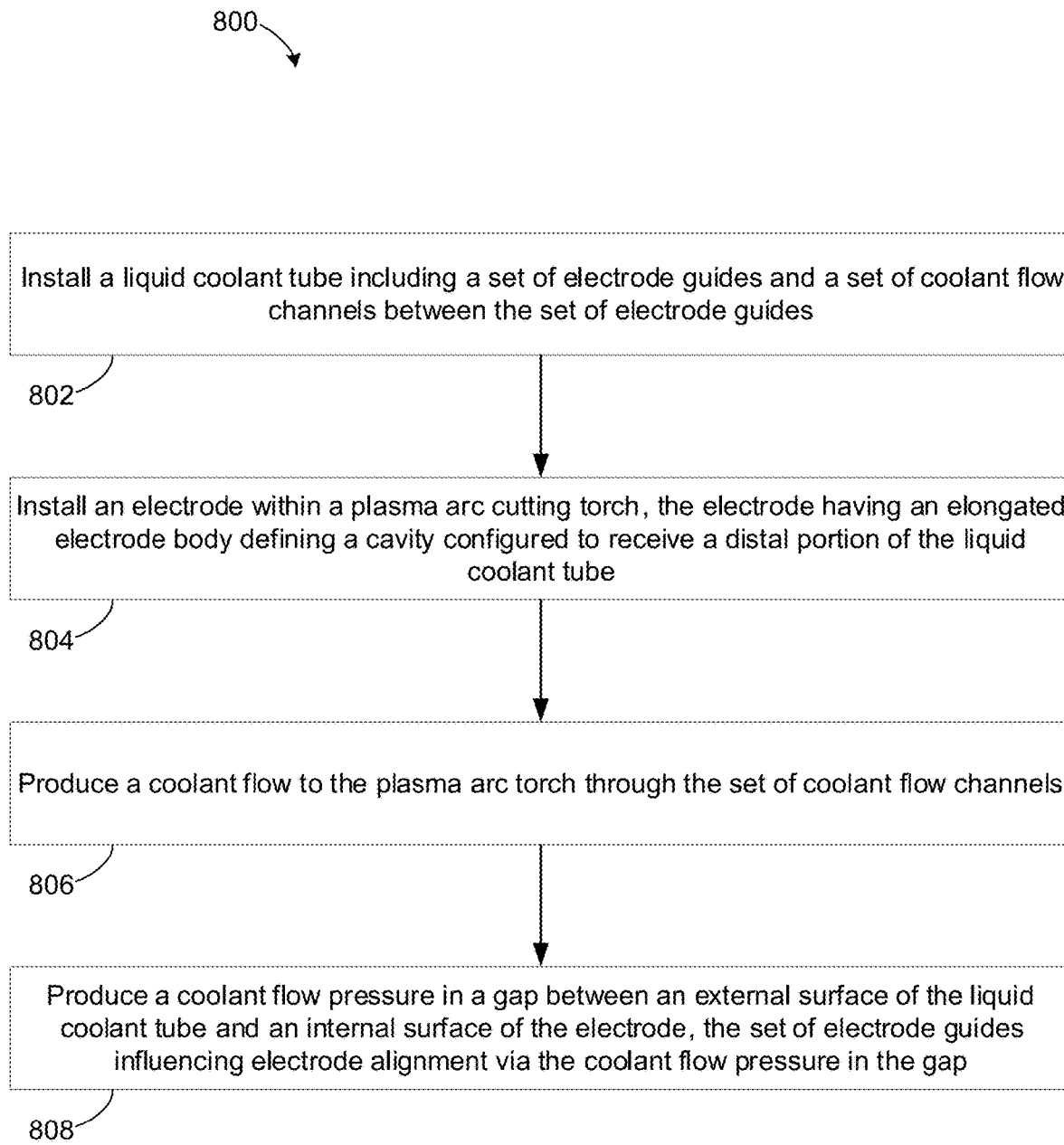
FIG. 8 is a flow diagram of method steps for aligning an electrode within a plasma arc cutting torch, according to an embodiment of the invention.

Referring to FIG. 8, a process 800 for aligning an electrode 200 within a plasma arc cutting torch 100 is illustrated. The process 800 begins by installing a liquid coolant tube 400 in step 802. The liquid coolant tube 400 includes a set of electrode guides 440 and a set of coolant flow channels 450 between the set of electrode guides 440. For example, in some embodiments, the liquid coolant tube 400 includes a hollow elongated inner body 420 shaped to translate within a hollow elongated outer body 410. In some embodiments, the hollow elongated inner body 420 is shaped and dimensioned to be supported by the hollow elongated outer body 410 proximate a distal tip of the hollow elongated inner body 420 and proximate a proximal tip of the hollow elongated inner body 420. In some embodiments, the liquid coolant tube 400 includes a retention feature configured to restrict an axial translation of the hollow elongated inner body 420 relative to the hollow elongated outer body 410.

Process 800 continues by installing the electrode 200 within the plasma arc cutting torch 100 in step 804. The electrode 200 includes an elongated electrode body defining a cavity 240 configured to receive a distal portion of the liquid coolant tube 400. Process 800 continues by producing a coolant flow through the plasma arc cutting torch 100 through the set of coolant flow channels 450 in step 806. Process 800 finishes by producing a coolant flow pressure in a gap 460 between an external surface of the liquid coolant tube 400 and an internal surface of the electrode 200 in step 808. The set of electrode guides 440 influence electrode alignment via the coolant flow pressure in the gap 460. For example, in some embodiments, the set of electrode guides 440 are lobbed in cross-sectional shape to matingly engage (e.g., via a coolant layer intermediary) an internal surface of the electrode 200.

As shown in FIG. 1, the liquid coolant tube embodiments described herein can be included in a liquid cooled contact start plasma arc cutting torch system 100. For example, in one aspect of the invention, a torch tip 120 for a plasma arc cutting torch 100 includes an electrode 200 having an elongated electrode body defining a cavity 240 configured to receive a distal portion of a liquid coolant tube 400. The liquid coolant tube 400 of the torch tip 120 includes a hollow elongated inner body 420 shaped to translate within a hollow elongated outer body 410. The hollow elongated outer body 410 of the liquid coolant tube 400 is shaped to fixedly connect (e.g., threaded) to the plasma arc cutting torch 100 and includes a set of electrode guides 440. An external surface of the hollow elongated outer body 410 and the set of electrode guides 440 partially define a set of coolant flow channels 450 between the set of electrode guides 440. The set of electrode guides 440 are shaped to facilitate alignment of the electrode 200 within the plasma arc cutting torch 100.

The systems and methods described herein provide a number of benefits over the current state of the art. Embodiments of this invention include liquid coolant tube designs which are rigidly attached to the torch unlike "floating" liquid coolant tube designs. In these embodiments, the liquid coolant tube functions as a guidepost maintaining electrode alignment with the torch (and in turn with the nozzle bore) during axial movement of the electrode under high coolant pressure. The two-piece embodiments (e.g., universal liquid coolant tube assembly) of the invention eliminate the need for separate/multiple liquid coolant tubes for separate electrode lengths (consumable stack ups). Some embodiments of the invention may be used with consumable stack ups without any relative motion among them (e.g., liquid cooled cartridge concepts using HVHF starting).

One skilled in the art will realize the invention can be embodied in other specific forms without departing from the spirit or essential characteristics thereof. The foregoing embodiments are therefore to be considered in all respects illustrative rather than limiting of the invention described herein. It will be appreciated that the illustrated embodiments and those otherwise discussed herein are merely examples of the invention and that other embodiments, incorporating changes thereto, including combinations of the illustrated embodiments, fall within the scope of the invention.

What is claimed:

1. A liquid coolant tube for a plasma arc cutting torch, the liquid coolant tube comprising:
   a hollow elongated inner body shaped to translate within a hollow elongated outer body; and
   the hollow elongated outer body comprising a set of electrode guides extending along an outer surface of the hollow elongated outer body, the hollow elongated outer body shaped to fixedly connect to the plasma arc cutting torch,
   wherein an external surface of the hollow elongated outer body and the set of electrode guides partially define a set of coolant flow channels extending along an outer surface of the hollow elongated outer body between the set of electrode guides, the set of electrode guides shaped to facilitate alignment of an electrode within the plasma arc cutting torch.

2. The liquid coolant tube of claim 1, wherein the set of coolant flow channels extend over a substantial axial length of the hollow elongated outer body.

3. The liquid coolant tube of claim 1, wherein the external surface of the hollow elongated outer body and an internal surface of the electrode define a gap having a coolant flow pressure.

4. The liquid coolant tube of claim 1, wherein the set of electrode guides are lobed in cross-sectional shape to matingly engage an internal surface of the electrode.

5. The liquid coolant tube of claim 1, wherein a portion of the external surface of the hollow elongated outer body partially defining the set of coolant flow channels is flat in cross-sectional shape.

6. The liquid coolant tube of claim 1, wherein a portion of the external surface of the hollow elongated outer body partially defining the set of coolant flow channels is concave in cross-sectional shape.

7. The liquid coolant tube of claim 1, wherein a distal tip of the hollow elongated outer body is chamfered.

8. A method of aligning an electrode within the plasma arc cutting torch of claim 1, the plasma arc cutting torch having the liquid coolant tube installed therein, the method comprising:
   installing the electrode within the plasma arc cutting torch, the electrode having an elongated electrode body defining a cavity configured to receive a distal portion of the liquid coolant tube;
   producing a coolant flow to the plasma arc cutting torch through the set of coolant flow channels; and
   producing a coolant flow pressure in a gap between an external surface of the liquid coolant tube and an internal surface of the electrode,
   wherein the set of electrode guides influence electrode alignment via the coolant flow pressure in the gap.

9. A liquid coolant tube for a plasma arc cutting torch, the liquid coolant tube comprising:

a hollow elongated outer body having a distal end and a proximal end, the proximal end of the hollow elongated outer body configured to be fixedly connected to the plasma arc cutting torch; and a hollow elongated inner body having a distal tip and a proximal tip, and shaped to translate within the hollow elongated outer body, wherein the hollow elongated inner body is shaped and dimensioned to be supported by the hollow elongated outer body proximate the distal tip and proximate the proximal tip, and wherein an axial translation of the hollow elongated inner body relative to the hollow elongated outer body increases a first distance between the distal tip of the hollow elongated inner body and the distal end of the hollow elongated outer body and decreases a second distance between the proximal tip of the hollow elongated inner body and the proximal end of the hollow elongated outer body.

10. The liquid coolant tube of claim 9, wherein the hollow elongated inner body is dimensioned to extend beyond the distal end of the hollow elongated outer body.

11. The liquid coolant tube of claim 9, wherein the hollow elongated outer body comprises a first axial length (L1) and the hollow elongated inner body comprises a second axial length (L2), wherein L2 is greater than L1.

12. The liquid coolant tube of claim 11, wherein the hollow elongated outer body comprises a first inner diameter (D1) and the hollow elongated inner body comprises a second inner diameter (D2), a first outer diameter (DO1), and a second outer diameter (DO2) located across an axial length of a center portion of the hollow elongated inner body, wherein DO2 is less than DO1.

13. The liquid coolant tube of claim 12, wherein a ratio of L2/DO1 is greater than 2.

14. The liquid coolant tube of claim 9, wherein an external surface of the hollow elongated outer body comprises a set of lobed guide surfaces shaped to guide alignment of an electrode of the plasma arc cutting torch.

15. The liquid coolant tube of claim 9, further comprising a retention feature configured to restrict an axial translation of the hollow elongated inner body relative to the hollow elongated outer body.

16. The liquid coolant tube of claim 15, wherein the retention feature comprises at least one of a radially outward flaring of the hollow elongated inner body or a cap component disposed about the proximal tip of the hollow elongated inner body.

17. The liquid coolant tube of claim 9, further comprising an alignment flange disposed on an external surface of the hollow elongated outer body, the alignment flange shaped to physically contact the torch via at least one of an axial surface or a circumferential surface.

18. The liquid coolant tube of claim 17, wherein an outer diameter of the alignment flange is larger than an outer diameter of the hollow elongated outer body.

19. A liquid coolant tube for a plasma arc cutting torch, the liquid coolant tube comprising:

a hollow elongated inner body shaped to fixedly connect to the plasma arc cutting torch; and a hollow elongated outer body comprising a set of electrode guides extending along an outer surface of the hollow elongated outer body, the hollow elongated outer body shaped to translate along an external surface of the hollow elongated inner body, wherein an external surface of the hollow elongated outer body and the set of electrode guides partially define a set of coolant flow channels extending along an outer surface of the hollow elongated outer body between the set of electrode guides, the set of electrode guides shaped to facilitate alignment of an electrode within the plasma arc cutting torch.

20. The liquid coolant tube of claim 19, wherein an axial translation of the hollow elongated outer body relative to the hollow elongated inner body increases a first distance between a distal end of the hollow elongated inner body and a distal end of the hollow elongated outer body, and increases a second distance between a proximal end of the hollow elongated inner body and a proximal end of the hollow elongated outer body.

21. The liquid coolant tube of claim 19, further comprising a retention feature configured to restrict at least one of an axial translation or a rotation of the hollow elongated outer body relative to the hollow elongated inner body.

22. The liquid coolant tube of claim 19, wherein the hollow elongated inner body comprises a first outer diameter (DO1) at a proximal end and a distal end of the hollow elongated inner body, and a second outer diameter (DO2) located across an axial length of a center portion of the hollow elongated inner body, wherein DO2 is less than DO1.

23. A torch tip for a plasma arc cutting torch, the torch tip comprising:

an electrode having an elongated electrode body defining a cavity configured to receive a distal portion of a liquid coolant tube; and a liquid coolant tube comprising:

a hollow elongated inner body shaped to translate within a hollow elongated outer body; and the hollow elongated outer body comprising a set of electrode guides extending along an outer surface of the hollow elongated outer body, the hollow elongated outer body shaped to fixedly connect to the plasma arc cutting torch, wherein an external surface of the hollow elongated outer body and the set of electrode guides partially define a set of coolant flow channels extending along an outer surface of the hollow elongated outer body between the set of electrode guides, the set of electrode guides shaped to facilitate alignment of the electrode within the plasma arc cutting torch.

* * * * *